(12) United States Patent
Strieter et al.

(10) Patent No.: US 10,811,934 B2
(45) Date of Patent: Oct. 20, 2020

(54) ELECTROMECHANICAL ACTUATOR PACKAGE WITH BELT DRIVE MECHANISM FOR STEER-BY-WIRE HAND WHEEL ACTUATOR

(71) Applicant: MANDO CORPORATION, Pyeongtaek-si (KR)

(72) Inventors: Troy Strieter, Sebewaing, MI (US); Joshua Grove, Sanford, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 113 days.

(21) Appl. No.: 16/118,434

(22) Filed: Aug. 31, 2018

(65) Prior Publication Data

US 2019/0245411 A1 Aug. 8, 2019

Related U.S. Application Data

(60) Provisional application No. 62/627,114, filed on Feb. 6, 2018, provisional application No. 62/634,140, filed
(Continued)

(51) Int. Cl.
*H02K 7/10* (2006.01)
*H02K 5/22* (2006.01)
(Continued)

(52) U.S. Cl.
CPC .......... *H02K 7/1004* (2013.01); *B62D 5/001* (2013.01); *B62D 5/006* (2013.01); *B62D 5/0406* (2013.01);
(Continued)

(58) Field of Classification Search
CPC ...... H02K 11/21; H02K 11/215; H02K 11/30; H02K 11/33; B62D 5/0403; B62D 5/0406;
(Continued)

(56) References Cited

U.S. PATENT DOCUMENTS 4,726,437 A * 2/1988 Norton ................. B62D 5/0463
180/444
6,854,443 B2 * 2/2005 Keefover .............. F02D 9/1065
123/337
(Continued)

FOREIGN PATENT DOCUMENTS

DE      102006036183 A1 * 2/2008 ............... B62D 3/02
DE      10 2010 044 540       3/2012
(Continued)

OTHER PUBLICATIONS

Extended European Search Report dated Jul. 8, 2019 for European Patent Application No. 19155428.6.

*Primary Examiner* — Burton S Mullins
(74) *Attorney, Agent, or Firm* — Ladas & Parry, LLP

(57) ABSTRACT

An electromechanical actuator package for supplying toque to a handwheel, may comprise: a motor comprising a motor rotor shaft; a belt drive mechanism connecting the motor rotor shaft to an actuator output via a drive belt, the actuator output directly or indirectly connected to the handwheel; a circuit board; and a housing enclosing the motor, the belt drive mechanism and the circuit board, wherein the circuit board is positioned between one end of the motor rotor shaft and an inner surface of the housing. The actuator output may protrude from the driven pulley in a direction away from the circuit board and pass through an opening formed in the lower surface of the housing. Alternatively, the actuator output may protrude from the driven pulley toward the circuit board and pass through openings formed in the circuit board and the upper surface of housing.

23 Claims, 13 Drawing Sheets

Related U.S. Application Data on Feb. 22, 2018, provisional application No. 62/627,116, filed on Feb. 6, 2018.

(51) Int. Cl.

| | |
|---|---|
| *H02K 11/215* | (2016.01) |
| *B62D 5/04* | (2006.01) |
| *B62D 5/00* | (2006.01) |
| *B62D 15/02* | (2006.01) |
| *F16H 7/02* | (2006.01) |
| *H01R 12/71* | (2011.01) |

(52) U.S. Cl.
CPC ....... *B62D 5/0412* (2013.01); *B62D 15/0215* (2013.01); *B62D 15/0235* (2013.01); *F16H 7/02* (2013.01); *H02K 5/225* (2013.01); *H02K 11/215* (2016.01); *H01R 12/716* (2013.01); *H02K 2211/03* (2013.01)

(58) Field of Classification Search
CPC . F16H 2057/02034; F16H 2057/02039; F16H 57/035
USPC .......................................................... 180/443
IPC ......................................................... B62D 5/04
See application file for complete search history.

(56) References Cited

U.S. PATENT DOCUMENTS

| | | | | |
|---|---|---|---|---|
| 7,654,693 | B2* | 2/2010 | Rasmussen | F21V 21/15 |
| | | | | 362/249.07 |
| 8,186,488 | B2* | 5/2012 | Poertzgen | B60T 13/746 |
| | | | | 188/162 |
| 8,312,959 | B1* | 11/2012 | Schneider | F16H 7/16 |
| | | | | 180/444 |
| 9,075,375 | B2* | 7/2015 | Tsuji | G03G 15/55 |
| 9,302,701 | B2* | 4/2016 | Schneider | B62D 5/0481 |
| 9,500,240 | B2* | 11/2016 | Fuse | F16D 55/226 |
| 2009/0133975 | A1* | 5/2009 | Gilles | B60T 13/741 |
| | | | | 188/72.6 |
| 2013/0237353 | A1* | 9/2013 | Scholten | B62D 5/006 |
| | | | | 474/114 |
| 2017/0210411 | A1* | 7/2017 | Kogure | F16H 37/02 |
| 2017/0314628 | A1* | 11/2017 | Kumbhar | F16D 65/18 |

FOREIGN PATENT DOCUMENTS

| | | | |
|---|---|---|---|
| DE | 10 2010 054 135 | 6/2012 | |
| JP | 2006-27580 | 2/2006 | |
| JP | 2007-131034 | 5/2007 | |
| JP | 2017-128250 | 7/2017 | |
| WO | 2016167252 | * 10/2016 | ............... B60S 1/26 |

* cited by examiner

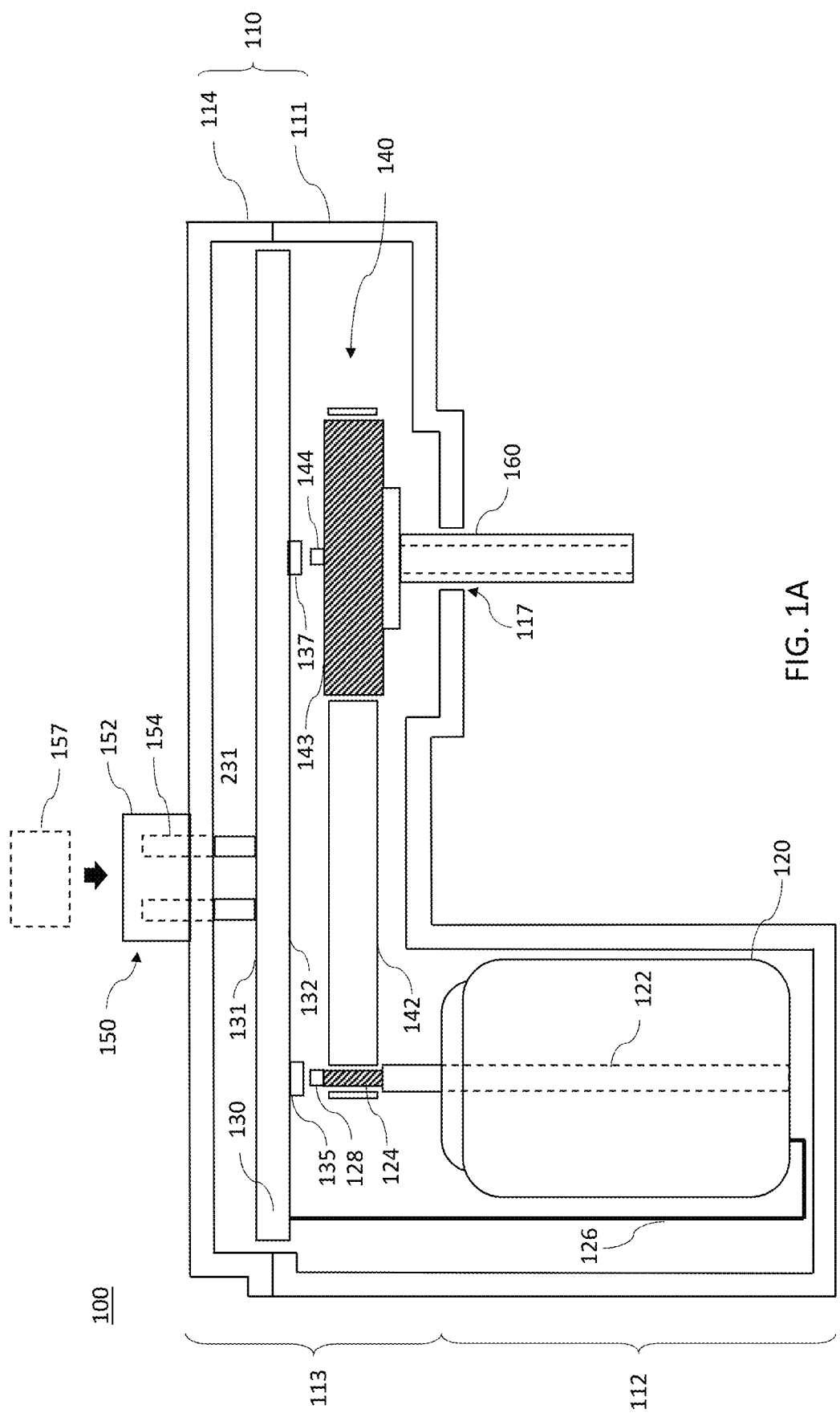

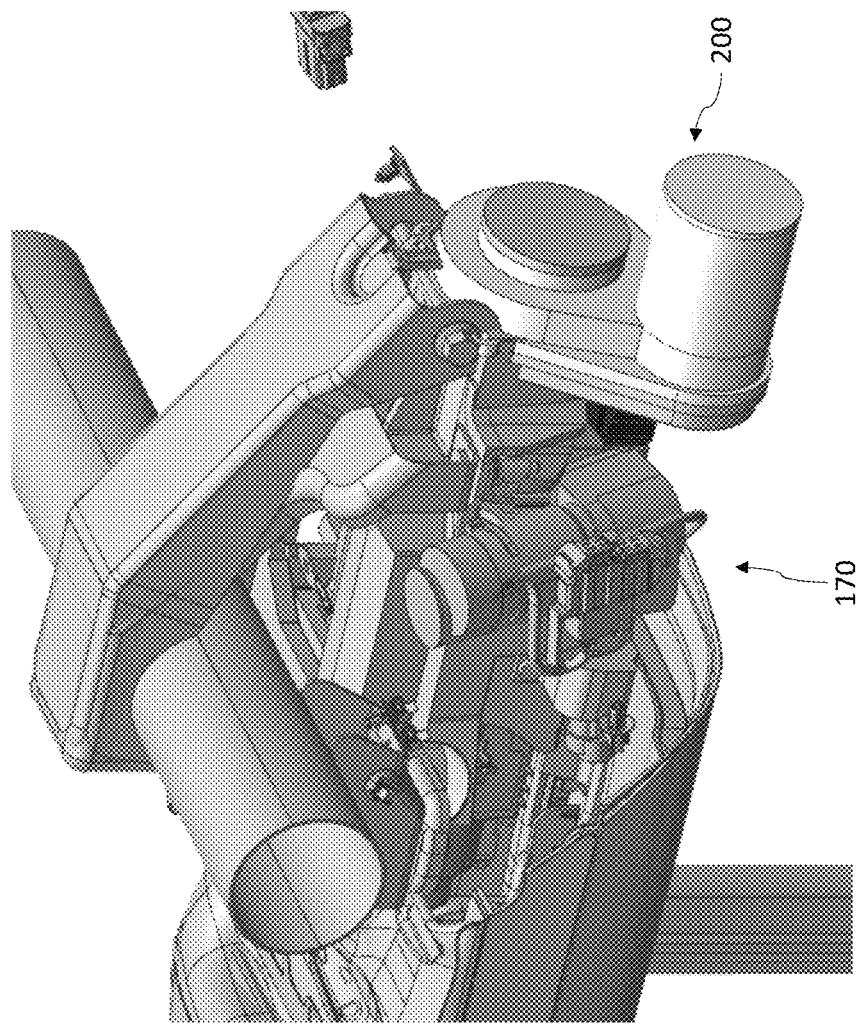

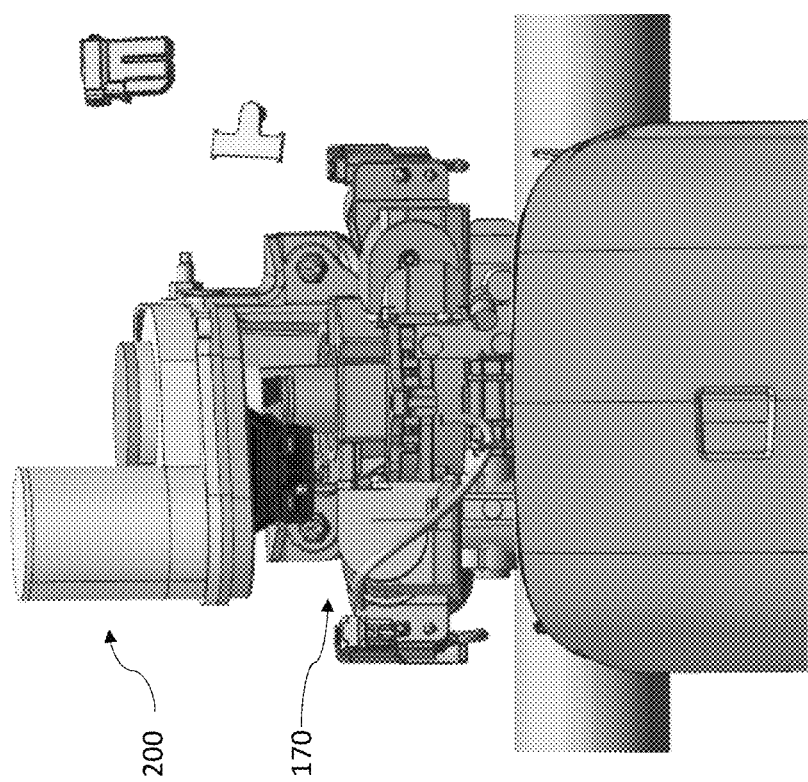

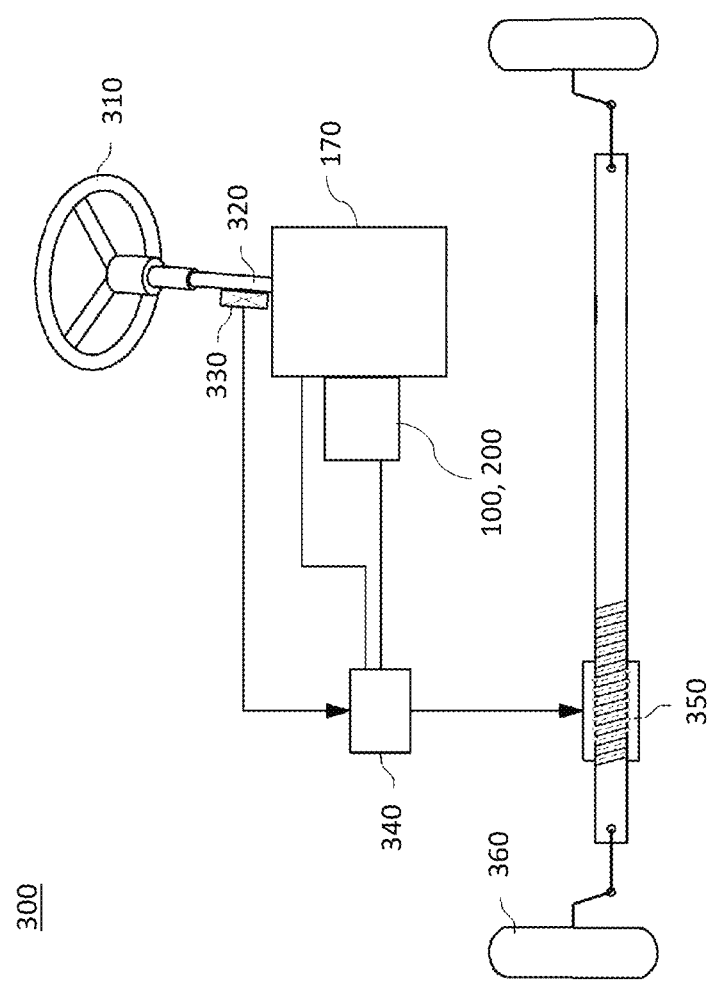

ELECTROMECHANICAL ACTUATOR PACKAGE WITH BELT DRIVE MECHANISM FOR STEER-BY-WIRE HAND WHEEL ACTUATOR

CROSS REFERENCE TO PARENT APPLICATIONS

This application claims the benefit of U.S. Patent Application Ser. No. 62/627,114, filed on Feb. 6, 2018, entitled "ELECTRIC BRAKE AND CALIPER—DUAL STAGE BELT DRIVE MECHANISM"; U.S. Patent Application Ser. No. 62/634,140, filed on Feb. 22, 2018, entitled "PULLEY INTEGRAL TYPE SHAFT"; and U.S. Patent Application Ser. No. 62/627,116, filed on Feb. 6, 2018, entitled "STEER-BY-WIRE HANDWHEEL ACTUATOR—BELT DRIVE MECHANISM", which are all hereby incorporated herein by reference in their entireties.

CROSS REFERENCE TO RELATED PATENT APPLICATIONS

This application is related to U.S. patent application Ser. No. 16/118,432, entitled "MOTOR WITH PULLEY MACHINED ON SHAFT AND BRAKE AND STEERING ASSEMBLIES INCLUDING THE SAME", filed on Aug. 31, 2018; and U.S. patent application Ser. No. 16/118,437, entitled "ELECTROMECHANICAL ACTUATOR PACKAGE WITH MULTI-STAGE BELT DRIVE MECHANISM", filed on Aug. 31, 2018. All of these applications are incorporated herein by reference in their entireties.

TECHNICAL FIELD

Some embodiments of the present disclosure generally relate to an electromechanical actuator package with a belt drive mechanism and, in particular, to a hand wheel actuator for a steer-by-wire system of a vehicle.

BACKGROUND

Automobiles are conventionally equipped with a pair of front road wheels that are steered to enable a vehicle to turn left and right as it maneuvers on land. It is also known to provide for steering rear wheels in automobiles. In the past, vehicle steering systems commonly employed a mechanical linkage between the driver-operated hand wheel and the front road wheels of an automotive vehicle. As the driver rotated the hand wheel, a mechanical linkage through the vehicle's tie-rods actuated the road wheels sometimes with assistance of a power assist steering motor or hydraulic piston.

Steer-by-wire steering systems have been introduced into automotive vehicles to provide road wheel steering function. Included in a typical steer-by-wire steering system is a hand wheel actuator for monitoring the angular position of the steering wheel and to provide feedback torque to the driver, and road wheel motor actuators which are controlled by controllers in response to tracking the sensed angular displacement of the hand wheel from a central position.

Conventional hand wheel actuators typically include a number of components including a hand wheel actuator, an electronic control unit, and a road wheel actuator. The hand wheel actuator includes one or more sensors and motors for sensing the position of the hand wheel and/or torque transmitted through the steering shaft. The hand wheel actuator also includes an electric motor, which provides torque and position feedback to the driver and an agreeable steering feel. Drivers expect hand wheels to have a certain feel that is consistent with a mechanical connection with the road wheels.

It would be desirable to have an apparatus and method that take into account some of the issues discussed above, as well as other possible issues.

SUMMARY

The features and advantages of the present disclosure will be more readily understood and apparent from the following detailed description, which should be read in conjunction with the accompanying drawings, and from the claims which are appended to the end of the detailed description.

According to various exemplary embodiment of the present disclosure, an electromechanical actuator package for supplying toque to a handwheel, may comprise: a motor comprising a motor rotor shaft; a belt drive mechanism connecting the motor rotor shaft to an actuator output via a drive belt, the actuator output directly or indirectly connected to the handwheel; a circuit board; and a housing enclosing the motor, the belt drive mechanism and the circuit board, wherein the circuit board is positioned between one end of the motor rotor shaft and an inner surface of the housing.

In some exemplary embodiments of the present disclosure, the motor rotor shaft may comprise, and the belt drive mechanism may comprise: the drive belt; and a driven pulley connected to the drive pulley of the motor rotor shaft via the drive belt, the driven pulley associated with the actuator output.

In certain exemplary embodiments of the present disclosure, the driven pulley of the motor rotor shaft may be machined on a circumferential surface of the motor rotor shaft.

According to some exemplary embodiments, the actuator output may protrude from the driven pulley in a direction away from the circuit board and pass through an opening formed in the lower surface of the housing.

According to certain exemplary embodiment, the actuator output may protrude from the driven pulley toward the circuit board and pass through opening formed in the circuit board and the upper surface of housing. The electric connector may have a bent shape so that a connection part of an external device can be easily connected to the electric connector.

A better understanding of the nature and advantages of the present disclosure may be gained with reference to the detailed description and the drawings below.

BRIEF DESCRIPTION OF THE DRAWINGS

Various embodiments in accordance with the present disclosure will be described with reference to the drawings, in which:

FIG. 1A shows a cross-sectional view of an electromechanical actuator package for a steer-by-wire hand wheel actuator according to a first exemplary embodiment of the present disclosure;

FIGS. 2E and 2F show an electromechanical actuator package for a steer-by-wire hand wheel actuator coupled to a steering column assembly according to a second exemplary embodiment of the present disclosure; and FIG. 3 shows a conceptual view of a steering assembly according to an exemplary embodiment of the present disclosure.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

Figure 1B:
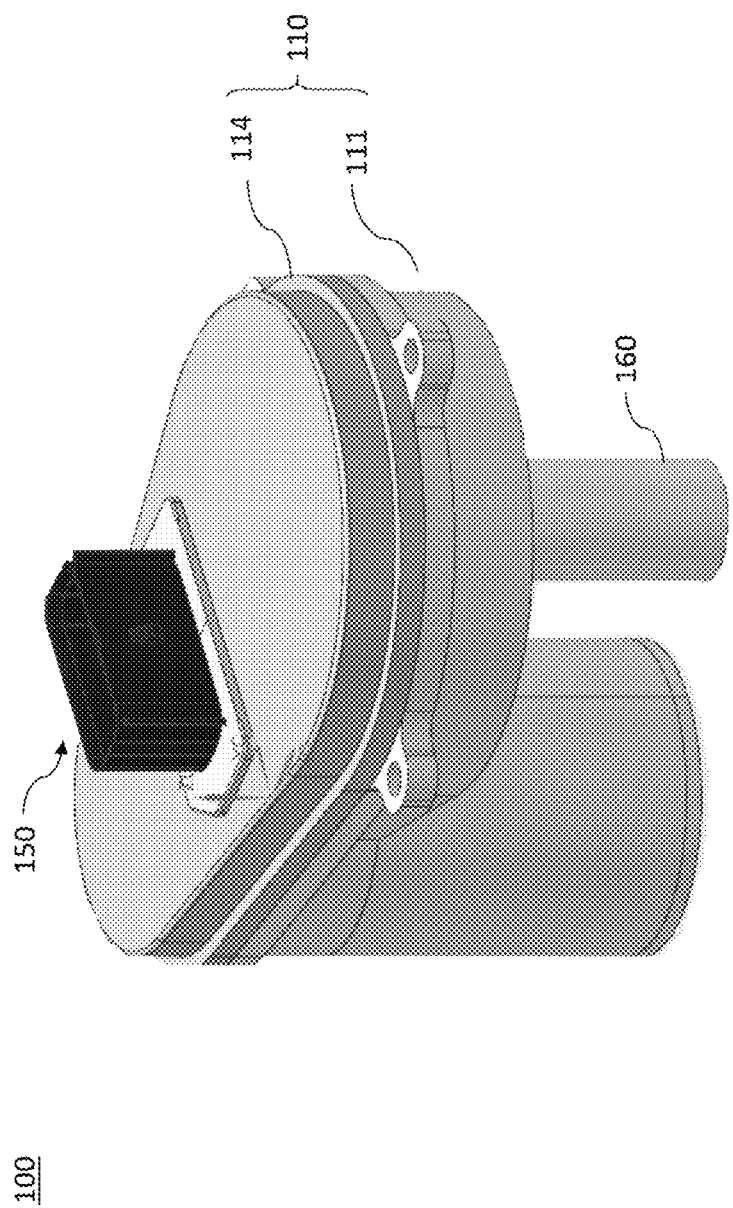
FIG. 1B shows a top perspective view of an electromechanical actuator package for a steer-by-wire hand wheel actuator according to a first exemplary embodiment of the present disclosure.
Figure 1C:
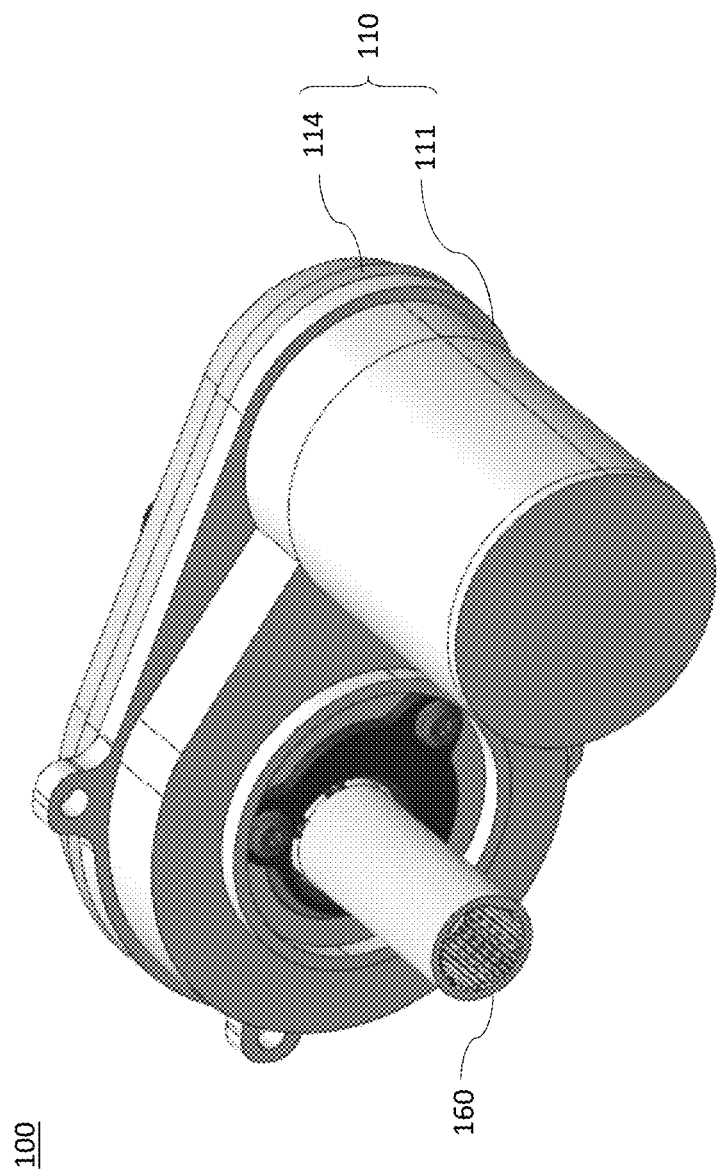
FIG. 1C shows a bottom perspective view of an electromechanical actuator package for a steer-by-wire hand wheel actuator according to a first exemplary embodiment of the present disclosure.
Figure 1D:
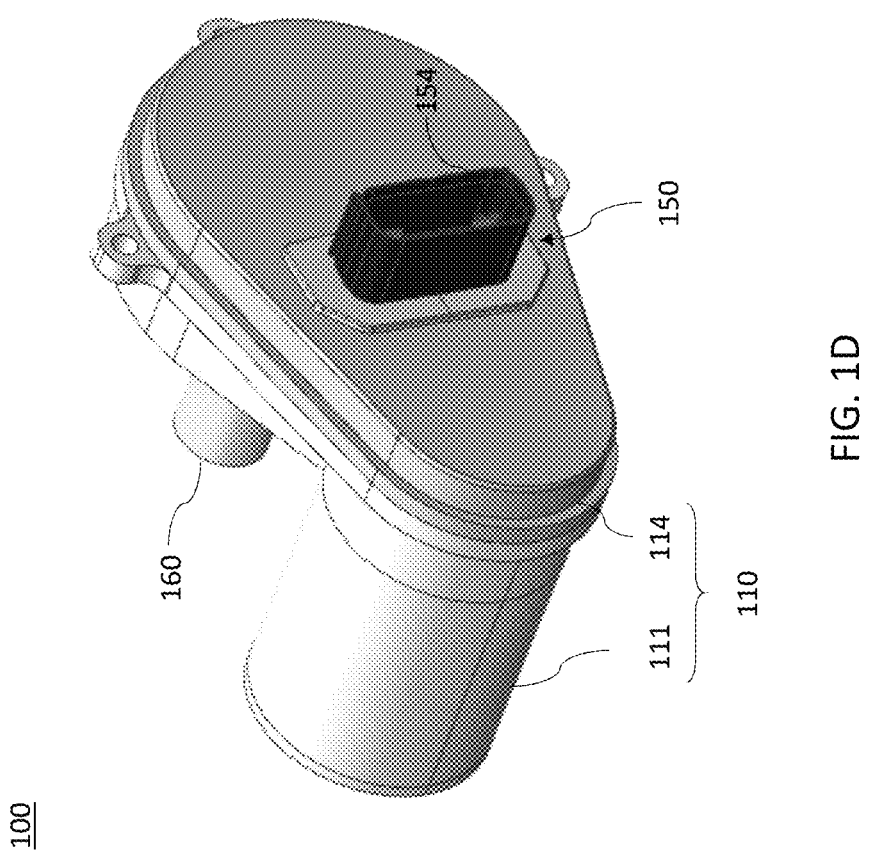
FIG. 1D shows another top perspective view of an electromechanical actuator package for a steer-by-wire hand wheel actuator according to a first exemplary embodiment of the present disclosure.

In the following detailed description, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

FIG. 3 shows a conceptual view of a steering assembly according to an exemplary embodiment of the present disclosure.

Driver input is made to a hand wheel 310, which is connected by a steering column assembly 170 to an electromechanical actuator package 100 of FIG. 1 (or 200 of FIG. 2) for a steer-by-wire hand wheel actuator. A steering system 300 may include one or more position sensors for detecting the angular displacement of the hand wheel 310. For example, a hand wheel position sensor 330 may be provided adjacent to or around the steering column 320 and a redundant position sensor may be included in the electromechanical actuator package 100 of FIG. 1 (or 200 of FIG. 2). The position sensor output is directed to an electronic control unit (ECU) 340, which may include a microprocessor and other assorted electronic components for providing memory, input/output, and processing functions. The ECU 340 receives signals from the hand wheel position sensors and determines what signals, if any, to send to a road wheel actuator 350 so that the position of road wheels 360 corresponds with the position of the hand wheel 310. The road wheel actuator 350 may control the steering position of the road wheels 360. The road wheel actuator 350 may include torque or strain sensors to measure force required by the road wheel actuator 350 to rotate and maintain the road wheel 360 in their desired position. The electromechanical actuator package 100 of FIG. 1 and 200 of FIG. 2 for a steer-by-wire hand wheel actuator may be configured to provide force-feedback to the handwheel 310.

FIGS. 1A-1F show various views of an electromechanical actuator package for a steer-by-wire hand wheel actuator according to a first exemplary embodiment of the present disclosure.

A motor 120 may be fixedly mounted in a housing 110. In the exemplary embodiment, the motor 120 may be disposed in the tubular cavity formed in the housing 110 and be fixed to a lower part of the housing 110. The motor 120 may provide the motive force of feedback to a hand wheel 310 of FIG. 3 operated by a driver. The motor 120 may be an electric motor, and may include a motor rotor shaft 122 axially extending toward a circuit board 130. The motor 120 may be electrically connected to the circuit board 130 and/or an electronic connector 150 via one or more electrical conductors 126. The electrical conductors 126 may connect the motor 120 to appropriate terminals on the circuit board 130 or the connector 150. The motor 120 is actuated and controlled by the circuit board 130 for providing the desired rotational speed and rotational direction of the motor rotor shaft 122 of the motor 120. Alternatively, the motor 120 may be electrically connected to an external device, such as a controller disposed outside of the electromechanical actuator package 100 and/or an external power supplier, via the connector 150 and be actuated and/or controlled by the external device.

The drive pulley 124 may be formed directly on the motor rotor shaft 122 or attached to the motor rotor shaft 122. In an exemplary embodiment, the drive pulley 124 may be directly machined on the circumferential surface of the motor rotor shaft 122 to be coupled with a drive belt 142. For example, the drive pulley 124 may be formed on or adjacent to a distal end of the motor rotor shaft 122. The drive pulley 124 may be directly splined on the surface of the motor rotor shaft 122. The drive pulley 124 may have an outer surface that engages an inner surface of the drive belt 142. The outer surface of the drive pulley 124 can have any suitable contour or texture to help ensure a gripping contact between the drive belt 142 and the drive pulley 124. For example, the outer surface of the toothed pulley 124 and the inner surface of the drive belt 142 can include toothed mating protrusions and/or notches formed therein. The drive pulley 124 may have alternating teeth and grooves on its outer surface to be meshed with alternating grooves and teeth formed on the inner surface of the drive belt 142. For example, the motor rotor shaft 122, the drive pulley 124 and the drive belt 142 may utilize aspects described in U.S. patent application Ser. No. 16/118,432, entitled "MOTOR WITH PULLEY MACHINED ON SHAFT AND BRAKE AND STEERING ASSEMBLIES INCLUDING THE SAME", filed on Aug. 31, 2018, which are all hereby incorporated herein by reference in their entireties. In another embodiment, instead of machining the drive pulley 124 on the circumferential surface of the motor rotor shaft 122, the drive pulley 124 may be mounted to and pressed in the motor rotor shaft 122 as a separate piece from the motor rotor shaft 122.

The drive pulley 124 of the motor rotor shaft 122 is rotatably engaged with a belt drive mechanism 140. In the exemplary embodiment, the belt drive mechanism 140 may be a single-stage belt drive mechanism. In another exemplary embodiment, the single stage belt drive mechanism 140 may be replaced with a multi-stage belt drive mechanism, for example, those described in U.S. patent application Ser. No. 16/118,437, entitled "ELECTROMECHANICAL ACTUATOR PACKAGE WITH MULTI-STAGE BELT DRIVE MECHANISM", filed on Aug. 31, 2018, which are all hereby incorporated herein by reference in its entirety.

The belt drive mechanism 140 may be configured to multiply torque from the motor 120 to supply resistive force to the vehicle's handwheel 310 of FIG. 3 via the actuator output 160. The belt drive mechanism 140 may comprise the drive belt 142 and a driven pulley 143. The drive pulley 124 of the motor rotor shaft 122 and the driven pulley 143 of the belt drive mechanism 140 are rotatably connected to each other via the drive belt 142. Each of the drive pully 124 and the driven pulley 143 has an outer surface that engages an inner surface of the drive belt 142. The surfaces of the drive pulley 124 and the driven pulley 143 can have any suitable contour or texture to help ensure a gripping contact between the belt 142 and the pulleys 124, 143. For example, the surfaces of the pulleys 124 and 143 and the inner surface of the belt 142 can include toothed mating protrusions and/or notches formed therein.

The drive belt 142 is fit relatively snugly about the outer circumferences of the drive pully 124 and the driven pulley 143. Thus, rotational movement of the drive pulley 124 of the motor rotor shaft 122 causes rotation of the driven pulley 143 of the belt drive mechanism 140. The diameters of the pulleys 224 and 243 can be any suitable dimension for providing any desired gear ratio, such that the rotational speed of the drive pulley 124 of the motor rotor shaft 122 is different from the rotational speed of the driven pulley 143 of the belt drive mechanism 140.

The drive belt 142 may be made from any suitable material or combination of materials flexible enough to loop around the pulleys 124 and 143 and maintain engagement with the outer surfaces of the pulleys 124 and 143 during rotation thereof. The drive belt 142 may be a vee belt or a cog belt, or may be made of individual links forming a chain. The drive belt 142 may be made of an elastomeric material, and may include internal metallic reinforcing members. The driven pulley 143 may be fixed to the actuator output 160. In operation, the belt drive mechanism 140 multiplies the torque from the motor 120 by using the drive pully 124 of the motor 120 and the driven pulley 143 rotatably connected by the drive belt 142, and the torque multiplied by the belt drive mechanism 140 is delivered to the actuator output 160 by the driven pulley 143 fixedly coupled to the actuator output 160.

The driven pulley 143 may be associated with the actuator output 160. For instance, the actuator output 160 may be formed directly on a surface of the driven pulley 143 or fixedly coupled to the driven pulley 143. The actuator output 160 may have various shapes that can be coupled to a part of a steering column assembly, for example, but not limited to a handwheel shaft, a steering shaft, a steering column or any shaft directly or indirectly connected to the handwheel shaft, the steering shaft or the steering column. In one example, the actuator output 160 may be formed as a protrusion extending from one side of the driven pulley 143, such as a toothed, threaded or splined shaft to prevent or minimize rotational lash. In another example, the actuator output 160 may be formed as a toothed, threaded or splined bore that can receive a part of the steering column assembly to prevent or minimize rotational lash. In the exemplary embodiment, the actuator output 160 may be attached to a shaft directly or indirectly connected to the handwheel 310 of FIG. 3 to generate axial force for supplying resistive torque.

The output torque from the actuator output 160 may be adjusted or scalable depending on the specific force torque requirements by varying the torque of the motor 120, the diameters of the pulleys 124 and 143, and/or the belt reduction ratio. The belt ratio (or 1/diameter ratio or speed ratio) between the drive pulley 124 of the motor rotor shaft 122 and the driven pulley 143 of the belt drive mechanism 140 may be, for example, but not limited to, between 1:5 and 1:8. In the exemplary embodiment, the belt ratio between the drive pulley 124 and the driven pulley 143 may be 1:6, although it is not required. According to the embodiment of the present disclosure, the belt drive mechanism 140 may improve mechanical efficiency as well as reduce the packaging size and mass. Furthermore, the belt drive mechanism 140 may reduce operational noise.

The circuit board 130 may be mounted inside of the housing 110. In the exemplary embodiment, the circuit board 130 may be fully contained within the housing 110. As illustrated in FIG. 1A, the circuit board 130 may be disposed in the uppermost portion of the housing 110. The circuit board 130 may be installed between one end of the motor rotation shaft 122, for example, but not limited to, a distal end of the motor rotation shaft 122 or the drive pully 124 of the motor rotation shaft 122, and the inner surface of the circuit board 130. The circuit board 130 may be arranged generally perpendicular to the axis of the motor rotation shaft 122, although it is not required. The circuit board 130 can be retained in the housing 110 by any suitable manner, such as by a plurality of clips or snaps integrally formed in the housing 110 or screws.

The circuit board 130 may comprise any suitable circuitry and electronic components, such as a microprocessor, mounted thereon. The circuit board 130 may be configured to control the motor 120, for example, but not limited to, supply power to the motor 120, activate or deactivate the operation of the motor 120, and vary the speed of the motor 120 and/or the rotational direction of the motor 120. The circuit board 130 may have a first and second opposed sides 131 and 132. The first side 131 of the circuit board 130 faces the inner (upper) surface of the housing 110. The second side 132 of the circuit board 130 faces the motor 120 and/or the belt drive mechanism 140. The circuitry and electronic components can be mounted on either of the sides 131 and 132, or on both the sides 131 and 132.

A motor position sensor 135 may be supported on the circuit board 130, and be electrically connected with the circuit board 130. For example, the motor position sensor 135 is directly mounted on the second side 132 of the circuit board 130 facing the distal end of the motor rotation shaft 122. Because the motor position sensor 135 is supported on the circuit board 130, the motor position sensor 135 can be easily electrically connected to the circuitry of the circuit board 130 without the need of a separate lead frame. The motor position sensor 135 can be directly connected to the circuit board 130, such as by soldering or by any other suitable method.

The motor position sensor 135 may be disposed in sensing relationship with the motor rotor shaft 122. For example, the motor position sensor 135 may be positioned adjacent to the distal end of the motor rotation shaft 122.

The motor position sensor 135 is responsive to the rotation of the motor rotation shaft 122. For example, the motor position sensor 135 and the motor rotation shaft 122 are configured such that the motor position sensor 135 can detect the rotational speed of the motor rotation shaft 122 and/or the rotational direction of the motor rotation shaft 122. Furthermore, the motor position sensor 135 and the motor rotation shaft 122 may be configured such that the motor position sensor 135 can detect the angular position of the motor rotation shaft 122. The motor position sensor 135 may generate an output signal indicative of the detected status of the motor rotation shaft 122 of the motor 120.

The motor position sensor 135 and the motor rotation shaft 122 can be any suitable device(s) for generating signal responsive to the rotation of the motor rotation shaft 122. For example, the motor position sensor 135 can be a non-contact limit switch. The motor position sensor 135 may be a Hall effect sensor. Correspondingly, the motor rotation shaft 122 may include a magnetic gradient 128 formed on a surface of the motor rotation shaft 122 which may be defined by a plurality of alternating north and south magnetically charged elements circumferentially spaced about the circumference of the motor rotation shaft 122. The magnetically charged elements 128 of the motor rotation shaft 122 can be any suitable component or material capable of retaining a magnetic charge. The magnetically charged elements 128 of the motor rotation shaft 222 can be formed and/or mounted on the surface of the motor rotation shaft 122 or can be disposed internally in the motor rotation shaft 128. For example, the magnet 128 for sensing the motor position may be pressed on the end of the motor rotation shaft 122. When the drive pulley 124 is mounted to the distal end or tip of the motor rotation shaft 122 as a separate element, the magnetically charged elements 128 may be formed and/or mounted on the drive pulley 124.

A redundant position sensor (or a handwheel position sensor) 137 may be configured to detect the angular displacement of the driven pulley 143 or the actuator output 160, or the angular displacement of the hand wheel 310 of FIG. 3, and transmit a signal representing the angular displacement of the driven pulley 143 or the actuator output 160 or the handwheel 310 of FIG. 3 to the circuit board 130. Similar to the motor position sensor 135, the redundant position sensor 137 may be supported on the circuit board 130, and be electrically connected with the circuit board 130. The redundant position sensor 137 may be disposed in sensing relationship with the driven pulley 143 of the belt drive mechanism 140. For example, the redundant position sensor 137 may be positioned adjacent to the driven pulley 143 of the belt drive mechanism 140.

The redundant position sensor 137 is responsive to the rotation of the driven pulley 143. For example, the redundant position sensor 137 and the driven pulley 143 may be configured such that the redundant position sensor 137 can detect the angular position of the driven pulley 143. Furthermore, the redundant position sensor 137 and the driven pulley 143 are configured such that the redundant position sensor 137 can detect the rotational speed of the driven pulley 143 and/or the rotational direction of the driven pulley 143. The redundant position sensor 137 may generate an output signal indicative of the detected status of the driven pulley 143 of the belt drive mechanism 140, for example, but not limited to, for sensing the position of the handwheel 310 of FIG. 3.

The redundant position sensor 137 and the driven pulley 143 can be any suitable device(s) for generating signal responsive to the rotation of the driven pulley 143. For example, the redundant position sensor 137 can be a non-contact limit switch. The redundant position sensor 137 may be a Hall effect sensor. Correspondingly, the driven pulley 143 may include a magnetic gradient 144 formed on a surface of the driven pulley 143 which may be defined by a plurality of alternating north and south magnetically charged elements. The magnetically charged elements 144 of the driven pulley 143 can be any suitable component or material capable of retaining a magnetic charge. The magnetically charged elements 144 of the driven pulley 143 can be formed and/or mounted on the surface of the driven pulley 143 or can be disposed internally in the driven pulley. For example, the magnet 144 for sensing the driven pulley 143 may be pressed on the side of the driven pulley 143 facing the circuit board 130.

By using the signals generated by the motor position sensor 135 and/or the redundant position sensor 137, belt failure can be detected by, for example, but not limited to, the circuit board 130 or the ECU 340 of FIG. 3.

The housing 110 may have one or more of planar and circular surfaces, openings for shafts and bearings and various recesses, shoulders, flanges, counterbores and the like to receive various components and assemblies of the electromechanical actuator package 100. Numerous different materials may suitably be used for the various components of the housing 110. For example, the housing 110 may be die cast of metal such as aluminum. In another example, the housing 110 may be formed from a polymeric material. Furthermore, the housing 110 may be formed from any other suitable strong and relatively light weight material.

The housing 110 may comprise a housing body 111 and a cover 114. The housing body 111 may enclose at least a portion of the motor 120, at least a portion of the circuit board 130 and/or at least a portion of the belt drive mechanism 140. The housing body 111 may comprise a vertical housing portion 112 and a planar housing portion 113. The vertical housing portion 112 and the planar housing portion 113 may be formed as a single piece or may be formed as multiple pieces coupled together. The tubular housing portion 112 defines a motor cavity receiving at least a portion of the motor 120. The vertical housing portion 112 may extend from the planar housing portion 114 in a direction perpendicular to a plane of the planar housing portion 114. The vertical housing portion 112 may have a cylindrical hollow shape, although it is not required. The planar housing portion 113 may define a cavity receiving at least a portion of the belt drive mechanism 140. Additionally, the planar housing portion 113 may define a cavity receiving at least a portion of the circuit board 130, although it is not required.

The lower part of the housing body 111 may have a hole 117 for the actuator output 160. The actuator output 160 may extend outwardly from the housing body 111 through the hole 117 of the housing body 111. Alternatively, the actuator output 160 may be disposed inside the housing body 110 and a part of the steering column assembly may be coupled to the actuator output 160 through the hole 117 of the housing body 111.

The cover 114 may be affixed to one side of the housing body 111 (e.g. the upper side of the housing body 111). The cover 114 may be secured to the housing body 111 using securement means, such as screws, snaps, clips or the like. The cover 114 enables assembly of or access to the circuit board 130. The cover 114 may enclose a portion of the circuit board 130 or may cover the first side 131 of the circuit board 130.

The housing 110 can have any suitable shape for housing the components of the electromechanical actuator package 100, and may be formed separately or in combination and can have multiple number of parts. The housing 110 may fully enclose the motor 120, the circuit board 130 and the belt drive mechanism 140 as a one single package. Accordingly, the exemplary embodiment may provide a modular "bolt-on" design. In another exemplary embodiment, the electromechanical actuator package 100 may be fully integrated into a steering column assembly 170 of FIGS. 1E and 1F.

The electromechanical actuator package 100 may further comprise an electric connector 150 capable of receiving and connecting with a connecting part 157 of an external device, such as a controller disposed outside of the electromechanical actuator package 100 for electrically communicating with the circuit board 130 and/or the motor 120 and/or an external power supplier for supplying power to the circuit board 130 and/or the motor 120. The electric connector 150 may comprise a connector housing 152 having a structure for receiving and connecting with the connecting part 157 of the external device. The connector housing 152 may be formed with the housing 110 as one single piece, for example, but not limited to, by molding. Alternatively, the connector housing 152 may be a separate part from the housing 110 and be secured to the housing 110. One or more electrical conductors 154 may extend from the connector housing 152 to the circuit board 130. A portion of the electrical conductors 154 may be disposed outside of the housing 110 and the connector housing 152 to be contacted with an electrical conductor of the connecting part 157 of the external device. The electric connector 150 may be either a male or female type connector. One end of the electrical conductors 154 of the connector housing 152 may be formed as a connector pin, plug or socket. The other end of the electrical conductors 154 may be connected to the circuit board 130 and/or the motor 120. For example, an electrical energy source, e.g. the vehicle battery, or an electronic control unit (ECU) may be connected to the circuit board 130 and/or the motor 120 via the connector pin 154 in the connector housing 152, which may be formed on a cover portion of the housing 110.

FIG. 2A-2F show various views of an electromechanical actuator package for a steer-by-wire hand wheel actuator according to a second exemplary embodiment of the present disclosure. An electromechanical actuator package 200 according to the second exemplary embodiment may have the same or similar elements as the electromechanical actuator package 100 of the first exemplary embodiment described above, but one or more of the circuit board 130, the actuator output 160, the redundant position sensor 137, the electric connector 150 and the housing 111.

In the first exemplary embodiment of FIG. 1, the actuator output 160 extends from the driven pulley 143 in a direction away from the circuit board 130 and passes through the opening 117 formed in the lower side of the housing body 111.

However, in the second exemplary embodiment of FIG. 2, the actuator output 160 extends from the driven pulley 143 toward a direction opposite to the actuator output 160 of the first exemplary embodiment. For example, the actuator output 160 according to the second exemplary embodiment extends from the drive pulley 143 toward the circuit board 130. As illustrated in FIG. 2A, the circuit board 130 may comprise a hole 210 through which the actuator output 160 can pass. The actuator output 160 may protrude outside of the housing 110 through an opening 220 formed in the upper housing cover 114 affixed to the upper side of the housing body 111. The redundant position sensor 137 may be formed adjacent to or around the hole 210 of the circuit board 130.

Figure 1E:
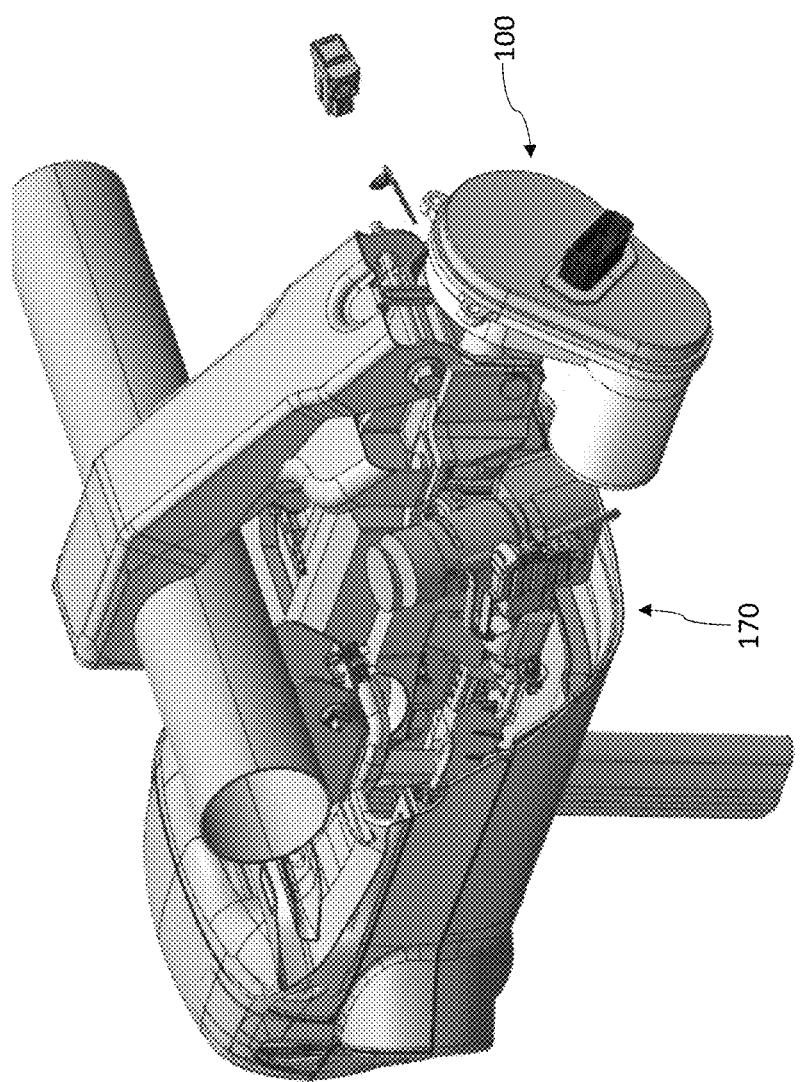
FIGS. 1E and 1F show an electromechanical actuator package for a steer-by-wire hand wheel actuator coupled to a steering column assembly according to a first exemplary embodiment of the present disclosure.
Figure 1F:
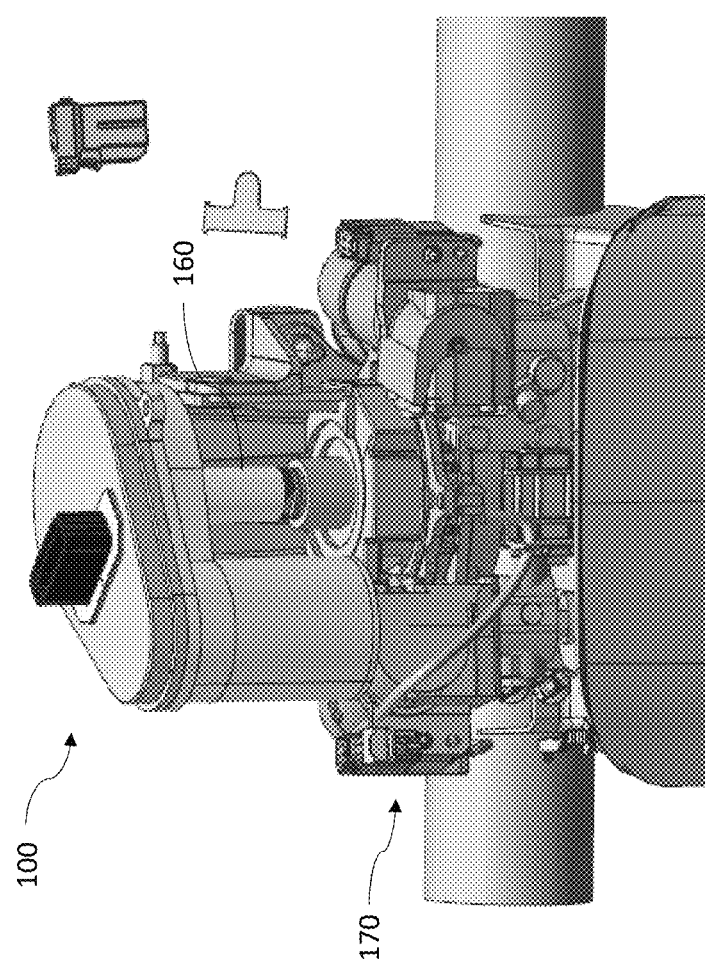
Figure 2A:
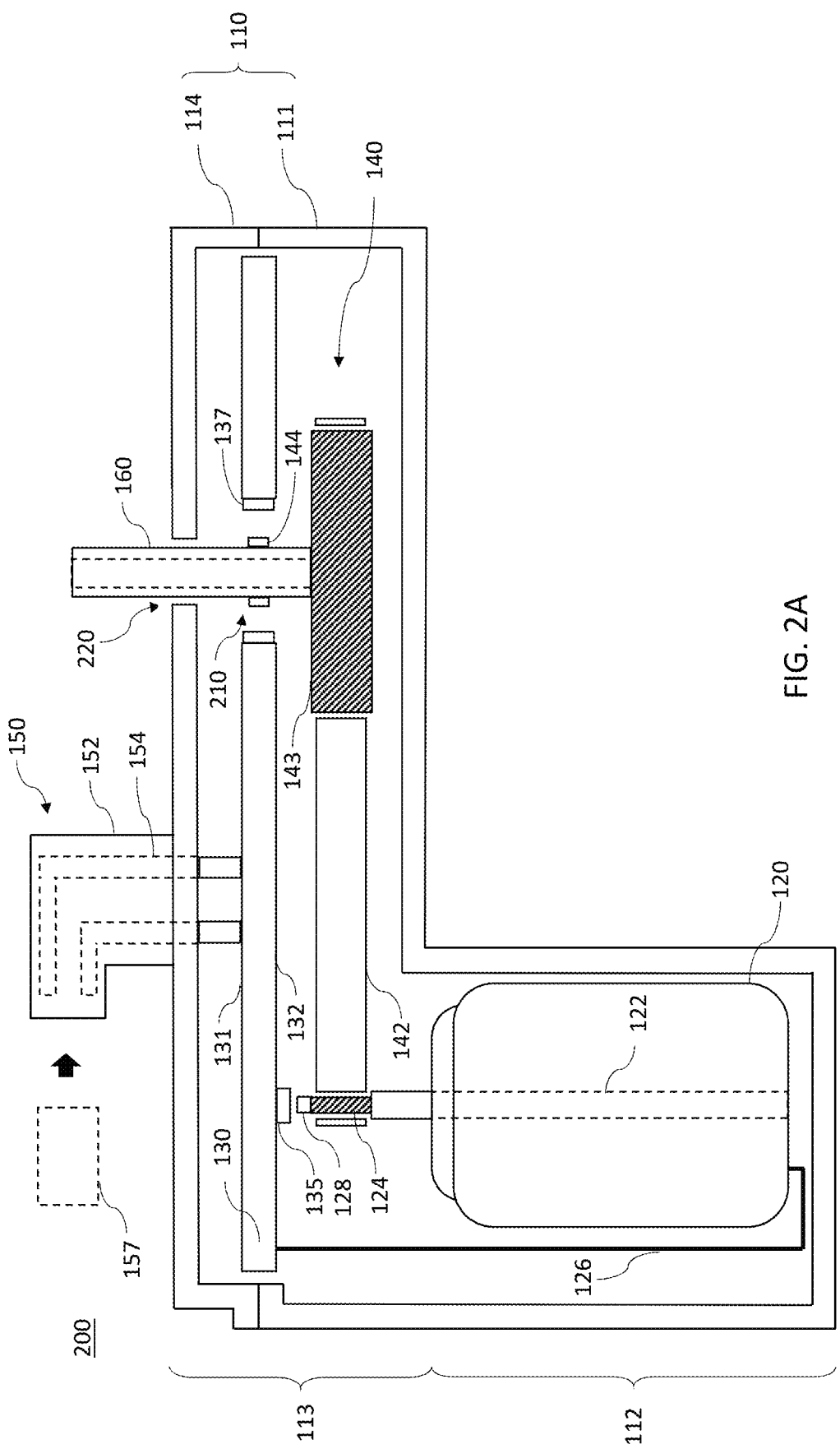
FIG. 2A shows a cross-sectional view of an electromechanical actuator package for a steer-by-wire hand wheel actuator according to a second exemplary embodiment of the present disclosure.
Figure 2B:
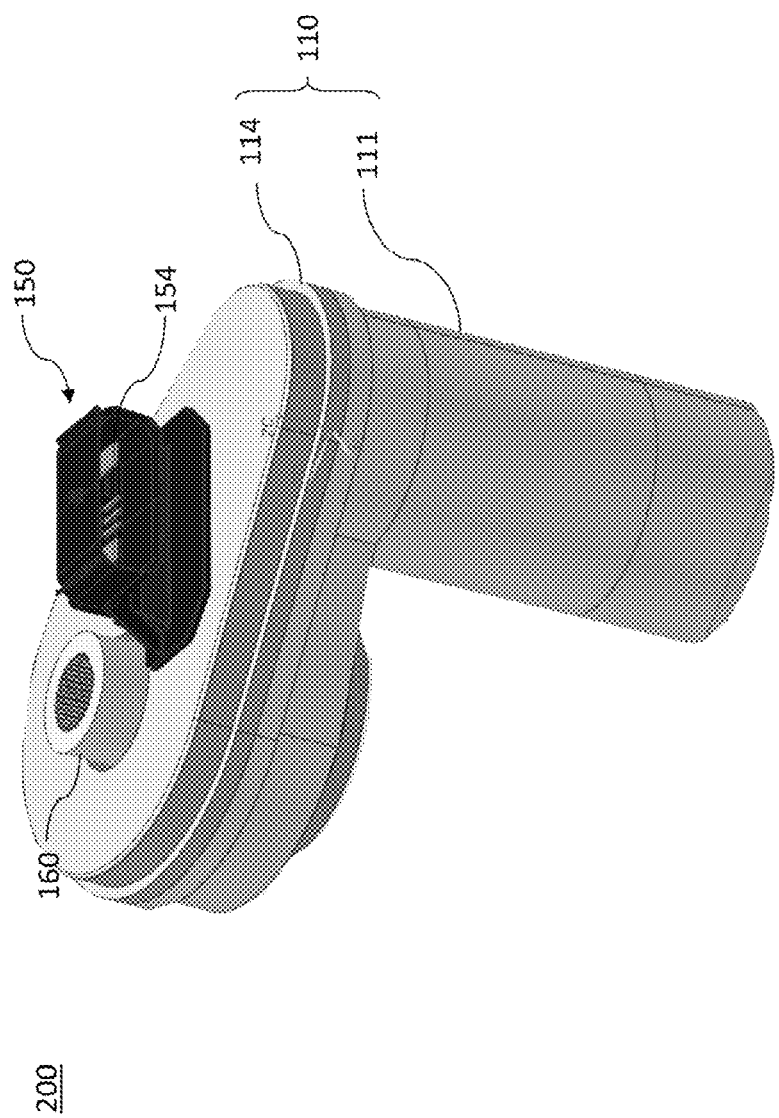
FIG. 2B shows a top perspective view of an electromechanical actuator package for a steer-by-wire hand wheel actuator according to a second exemplary embodiment of the present disclosure.
Figure 2C:
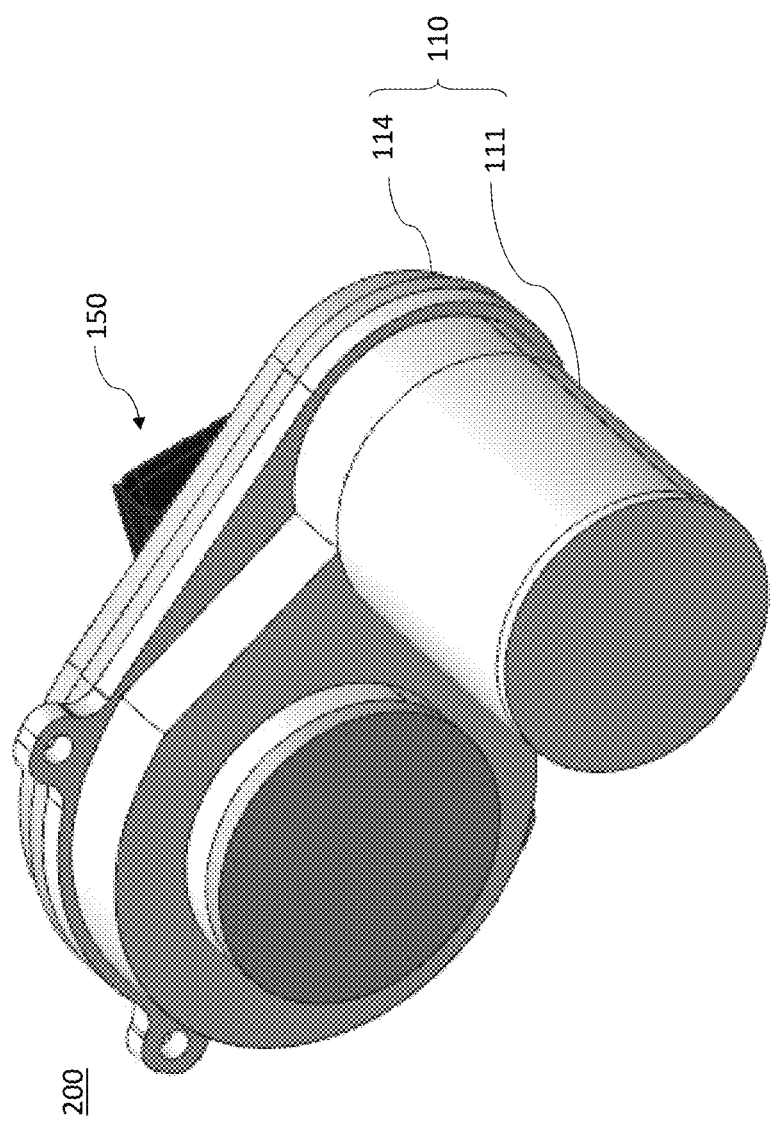
FIG. 2C shows a bottom perspective view of an electromechanical actuator package for a steer-by-wire hand wheel actuator according to a second exemplary embodiment of the present disclosure.
Figure 2D:
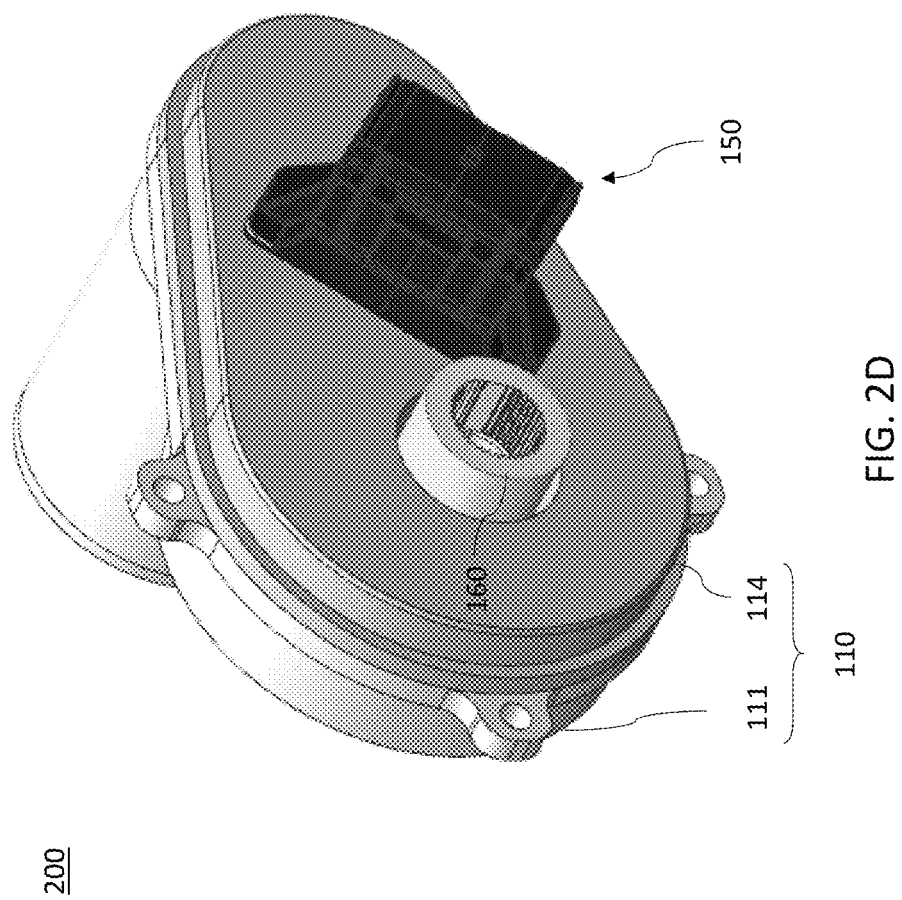
FIG. 2D shows another top perspective view of an electromechanical actuator package for a steer-by-wire hand wheel actuator according to a second exemplary embodiment of the present disclosure.

In the first exemplary embodiment, as shown in FIGS. 1E and 1F, the actuator output 160 protruding from the hole 117 formed in the lower side of the housing body 111 is coupled to a part of the steering column assembly 170, for example, but not limited to a handwheel shaft, a steering shaft, a steering column or any shaft directly or indirectly connected to the handwheel shaft, the steering shaft or the steering column. Accordingly, the bottom surface of the electromechanical actuator package 200 of the first exemplary embodiment faces the steering column assembly 170. By way of contrast, the actuator output 160 according to the second exemplary embodiment couples to the part of the steering column assembly 170 in an opposite direction to the first exemplary embodiment. In the second exemplary embodiment, as shown in FIGS. 2E and 2F, the actuator output 160 protruding from the opening 220 formed in the upper side of the housing body 111 is coupled to the part of the steering column assembly 170. Therefore, the top surface of the electromechanical actuator package 200 of the second exemplary embodiment faces the steering column assembly 170.

In the first exemplary embodiment shown in FIGS. 1A, 1B and 1D-1F, the electric connector 152 has a straight hollow shape. However, in the second exemplary embodiment, as shown in FIGS. 2A, 2B and 2D-2F, the electric connector 152 may have a bent shape. For example, the connector 150 may be bent generally away from the actuator output 160, or may be bent at a 90 degree angle, or may be bent in any direction or angle that the connecting part 157 of the external device can be easily coupled to the electric connector 150. Alternatively, the connector 152 of the first exemplary embodiment may have a bent shape and/or the connector 152 of the second exemplary embodiment may have a straight hollow shape.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A electromechanical actuator package for supplying torque, comprising:
   a motor comprising a motor rotor shaft;
   a belt drive mechanism connecting the motor rotor shaft to an actuator output via a drive belt;
   a circuit board;

a housing enclosing the motor, the belt drive mechanism and the circuit board, wherein the circuit board is positioned between one end of the motor rotor shaft and an inner surface of the housing; and a motor position sensor configured to sense a position of the motor rotor shaft, wherein the motor position sensor is positioned on a first surface of the circuit board opposite to a second surface of the circuit board facing the inner surface of the housing.

2. The electromechanical actuator package of claim 1, wherein the motor rotor shaft comprises a drive pulley, and wherein the belt drive mechanism comprises:

the drive belt; and a driven pulley connected to the drive pulley of the motor rotor shaft via the drive belt, the driven pulley associated with the actuator output.

3. The electromechanical actuator package of claim 2, wherein the actuator output protrudes from the driven pulley in a direction away from the circuit board.

4. The electromechanical actuator package of claim 2, wherein:

the motor rotor shaft extends from the motor in a first direction, and the actuator output extends from the driven pulley in a second direction opposite to the first direction.

5. The electromechanical actuator package of claim 1, wherein the drive pulley of the motor rotor shaft is machined on a circumferential surface of the motor rotor shaft.

6. The electromechanical actuator package of claim 1, wherein the circuit board is disposed perpendicular to the motor rotor shaft.

7. The electromechanical actuator package of claim 1, wherein a speed reduction ratio between a rotational speed of the motor rotor shaft and a rotational speed of the actuator output is between 5 and 8.

8. The electromechanical actuator package of claim 1, wherein a speed reduction ratio between a rotational speed of the motor rotor shaft and a rotational speed of the actuator output is around 6.

9. The electromechanical actuator package of claim 1, wherein the actuator output is connected to a handwheel, and the motor position sensor faces the one end of the motor rotor shaft.

10. The electromechanical actuator package of claim 1, wherein the motor position sensor is positioned adjacent to a distal end of the motor rotor shaft.

11. The electromechanical actuator package of claim 1, further comprising a pulley position sensor configured to sense a position of the driven pulley and/or the actuator output, the pulley position sensor disposed on the circuit board and facing the driven pulley and/or the actuator output.

12. The electromechanical actuator package of claim 11, wherein the pulley position sensor is positioned on a first surface of the circuit board opposite to a second surface of the circuit board facing the inner surface of the housing.

13. The electromechanical actuator package of claim 1, wherein the housing comprising:

a housing body enclosing at least a portion of the motor and at least a portion of the belt drive mechanism; and a cover affixed to one side of the housing body and covering at least a portion of the circuit board.

14. The electromechanical actuator package of claim 1, further comprising an electric connector formed at the housing and electrically connected to the circuit board and/or the motor.

15. The electromechanical actuator package of claim 14, wherein the electric connector comprises:

a connector housing configured to receive and connect with an external device; and one or more electrical conductors extending from the connector housing to the circuit board to electrically connect the external device to the circuit board and/or the motor.

16. The electromechanical actuator package of claim 14, wherein the electric connector has a bent shape.

17. The electromechanical actuator package of claim 16, wherein the electric connector is bent toward a direction perpendicular to the motor rotor shaft.

18. The electromechanical actuator package of claim 16, wherein the electric connector is bent generally away from the actuator output.

19. A electromechanical actuator package for supplying torque, comprising:

a motor comprising a motor rotor shaft;

a belt drive mechanism connecting the motor rotor shaft to an actuator output via a drive belt;

a circuit board; and a housing enclosing the motor, the belt drive mechanism and the circuit board, wherein the circuit board is positioned between one end of the motor rotor shaft and an inner surface of the housing, wherein a diameter of the drive pulley is smaller than a diameter of the motor rotor shaft.

20. A electromechanical actuator package for supplying torque, comprising:

a motor comprising a motor rotor shaft;

a belt drive mechanism connecting the motor rotor shaft to an actuator output via a drive belt;

a circuit board; and a housing enclosing the motor, the belt drive mechanism and the circuit board, wherein the circuit board is positioned between one end of the motor rotor shaft and an inner surface of the housing, wherein the circuit board includes a first opening through which the actuator output passes.

21. The electromechanical actuator package of claim 20, wherein the housing comprises a second opening, and the actuator output passes through the first opening of the circuit board and the second opening of the housing.

22. The electromechanical actuator package of claim 20, wherein the motor rotor shaft comprises a drive pulley, and wherein the belt drive mechanism comprises:

the drive belt; and a driven pulley connected to the drive pulley of the motor rotor shaft via the drive belt, the driven pulley associated with the actuator output.

23. The electromechanical actuator package of claim 22, wherein:

the housing comprises a first portion for receiving the motor and a second portion for receiving the circuit board, the second portion of the housing comprising a second opening, and the actuator output protrudes from the driven pulley toward the circuit board and passes through the first opening of the circuit board and the second opening formed in the second portion of the housing.

* * * * *